United States Patent
Stenstrom

[15] 3,668,358
[45] June 6, 1972

[54] APPARATUS FOR ELECTROMAGNETIC HEATING OF LIQUIDS

[72] Inventor: Lennart Arvid Stenstrom, Huddinge, Sweden

[73] Assignee: Alfa-Laval AB, Tumba, Sweden

[22] Filed: May 21, 1970

[21] Appl. No.: 39,250

[30] Foreign Application Priority Data

May 27, 1969 Sweden..................................7461/69

[52] U.S. Cl.....................................219/10.65, 219/10.55
[51] Int. Cl.........................................H05b 5/00, H05b 9/06
[58] Field of Search..................................219/10.65, 10.55

[56] References Cited
UNITED STATES PATENTS

| | | |
|---|---|---|
| 2,585,970 | 2/1952 | Shaw..................................219/10.55 X |
| 2,602,134 | 7/1952 | Nelson................................219/10.55 |
| 3,307,010 | 2/1967 | Puschner.............................219/10.55 |
| 3,532,847 | 10/1970 | Puschner.............................219/10.55 |
| 2,353,362 | 7/1944 | Rudd..................................219/10.55 X |
| 2,508,365 | 5/1950 | Bierwirth............................219/10.65 X |
| 3,535,482 | 10/1970 | Kluck.................................219/10.55 |

Primary Examiner—J. V. Truhe
Assistant Examiner—Hugh D. Jaeger
Attorney—Davis, Hoxie, Faithfull & Hapgood

[57] ABSTRACT

The liquid to be heated is formed by suitable means into a jet having an annular cross-section and which is free from contact with any surface; and means are provided for transferring to the annular jet electromagnetic energy uniformly distributed around the periphery of the jet as viewed in said cross-section.

7 Claims, 1 Drawing Figure

PATENTED JUN 6 1972
3,668,358
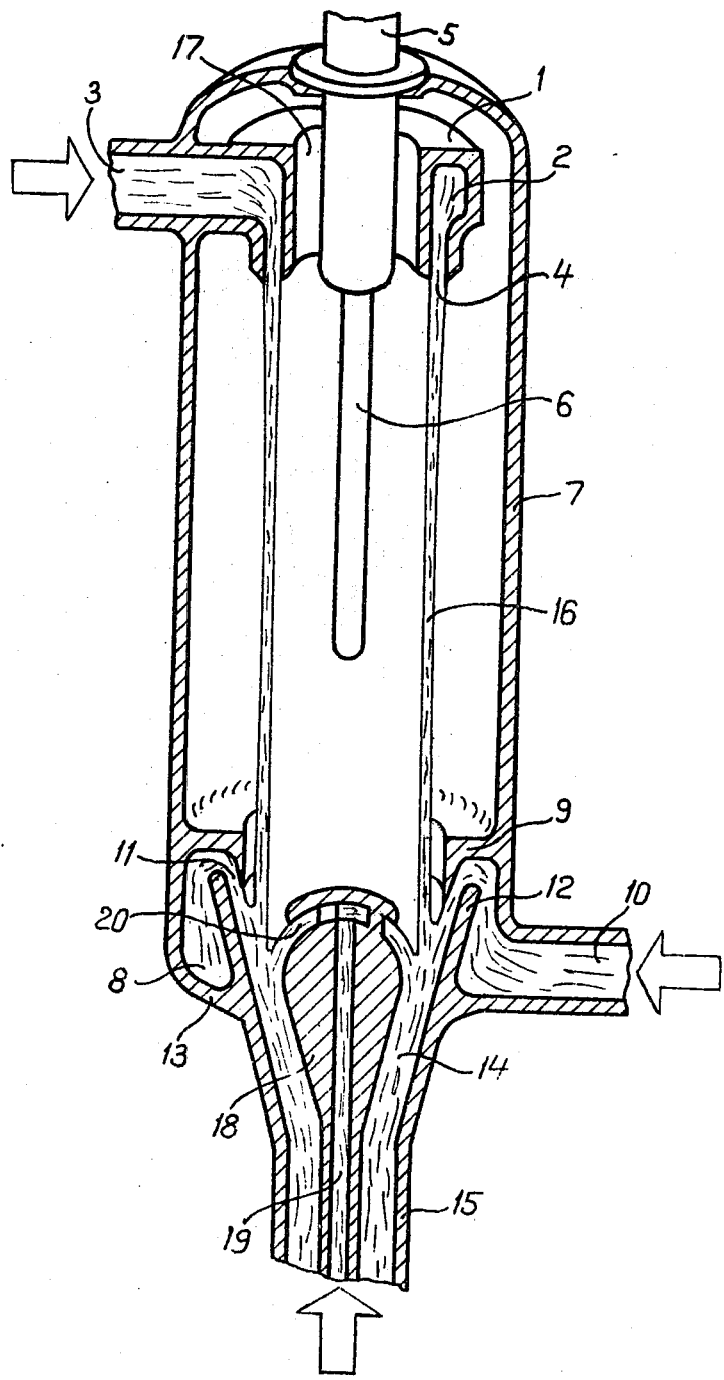
INVENTOR
LENNART ARVID STENSTROM
BY
Davis, Hoxie, Faithfull + Hapgood
ATTORNEYS

APPARATUS FOR ELECTROMAGNETIC HEATING OF LIQUIDS

THE DISCLOSURE

Liquids are commonly heated by one of two methods, namely, indirect or direct heating. With indirect heating, the liquid receives heat from a hot surface, such as a heat exchanging plate in a plate heat exchanger, while direct heating generally is accomplished by blowing steam into the liquid.

Both of these methods have their disadvantages in the heating of liquids of different kinds. Thus, indirect heating often gives rise to difficulties due to the fact that the liquid which is being heated burns onto the heating surface, which causes severe cleaning problems and generally necessitates frequent interruptions of the operation of the heating apparatus. The direct heating by means of steam, although avoiding these specific problems, has other disadvantages. For instance, this method is not suitable for all liquids because of the dilution of the liquid by condensed and often polluted steam.

With the recent rapid development of the so-called microwave technique and the expanding knowledge in this field, different proposals have been made concerning the use of microwaves for heating liquids. None of these proposals, however, has led to any practically usable apparatus for heating sensitive liquids. Thus, sterilization of milk is still performed by one of the two previously mentioned heating methods, which for milk are especially disadvantageous.

A rather early proposal was to allow a free liquid jet to pass through an electromagnetic field so as to be heated by the same. This idea was not satisfactorily usable in practice, however, for it proved difficult to achieve an absolutely even distribution of the electromagnetic energy within the jet. The electromagnetic energy is gradually absorbed by the liquid when penetrating the jet, which causes some parts of the jet to be heated more than others.

For avoiding this disadvantage, it has been proposed to provide a jet in the form of a thin ribbon, the electromagnetic field being intended to penetrate the ribbon substantially perpendicular to its broad side, in order that the field strength be changed very little when passing through the jet. (See U. S. Pat. No. 2,508,365). Here another electromagnetic effect, occurring also in connection with a circular jet, is especially pronounced. The effect is that a temperature is obtained in the edge portions of the ribbon-formed jet which differs from that obtained in the rest of the jet. This can be explained by the fact that the jet attracts those parts of the electromagnetic field which, if the jet had no attracting effect, would be situated just beside the jet.

Another disturbing edge effect in connection with a ribbon-formed jet, which also results in an uneven heating of the liquid in the jet, is the gradual deformation of the jet caused by the surface tension of the liquid.

An object of the present invention is to avoid the above-mentioned disadvantages of prior proposals for heating a free liquid jet in an electromagnetic field.

This object is achieved according to the invention by an apparatus characterized by means for providing a jet of the liquid to be heated, which jet is free from contact with any surface and has an annular cross section, and means arranged to transfer to the jet, thus formed, electromagnetic energy uniformly distributed around the periphery of the jet, as seen in the cross section of the jet. With such an apparatus it is possible to obtain a thin layer of liquid to be heated, evenly irradiated by electromagnetic energy, while avoiding the above-described edge effects. Thus, great demands upon a uniform distribution of the electromagnetic energy in the jet can be fulfilled.

To avoid loss of energy by radiation from the apparatus of the invention, the previously mentioned means for transferring electromagnetic energy to the jet preferably comprises two members, co-operating in a known manner, which are arranged coaxially relative to the formed liquid jet, and at least one of which is arranged to emit electromagnetic energy, preferably microwaves. Both of these members may be placed within or surround the liquid jet to be heated, but preferably one of the members is placed within the jet, while the other surrounds it. An arrangement of this last-mentioned kind makes the apparatus simple in construction, and it also results in a direct transfer of electromagnetic energy to the jet, which is particularly advantageous from the efficiency point of view.

In the apparatus according to the invention, the aforementioned means for transferring electromagnetic energy to the jet preferably is arranged to generate electromagnetic waves in the space where the jet is to be heated, which waves have a frequency such that resonance is achieved in this space. A resonance of this kind provides a great electromagnetic field strength, thus enabling a good heating even of liquids which absorb electromagnetic energy only to a comparatively small extent.

In the following, the invention will be further described with reference to the accompanying drawing, in which the single illustration is a vertical sectional view of a preferred embodiment of the apparatus according to the invention.

The apparatus as illustrated comprises a ring-like member 1 forming an annular chamber 2. The chamber 2 has a radially extending inlet 3 for a liquid to be heat treated in the apparatus, and also has an outlet 4 in the form of an annular slot extending through the bottom of the member 1 and concentric to the axis of chamber 2.

Extending centrally through the ring-like member 1 is a holder 5 for a member 6, resembling an aerial, which is arranged below and coaxially with the annular outlet 4 of the chamber 2. The member 1 as well as the member 6 are surrounded by a coaxial, cylindrical casing 7, which in its lower part (i.e. a little bit below the member 6) has a chamber 8. This chamber 8 is separated from the other part of the interior of the casing 7 by a flange 9 extending from the peripheral wall of the casing radially inward, and chamber 8 has a radially extending inlet 10 for previously heat-treated, cooled liquid and an annular outlet 11. The latter opens into the rest of the interior of the casing 7 just below the flange 9. The casing 7 has another annular flange 12 which extends like a funnel upward from the bottom wall 13 of the casing, surrounding an outlet 14 situated therein. The funnel-like flange 12 constitutes the upper end portion of an outlet pipe 15 extending downward from the bottom wall 13 of the casing 7.

Liquid to be heated is supplied through the inlet 3 to the chamber 2. From the chamber 2, the liquid then flows through the bottom outlet 4 which, because it constitutes a liquid discharging portion extending generally along a closed circuit or annulus, forms in the casing 7 a freely-falling liquid jet 16 having an annular cross section. Due to the described arrangement of the member 6 relative to the annular outlet 4 of the chamber 2, the member 6 will be situated centrally of and extend coaxially with the formed jet, the cross section of which is annular. The member 6, being arranged to emit microwaves uniformly distributed around the whole of its periphery, will provide for an even heating of the falling jet. To make use of as much energy as possible emitted by the member 6, the casing 7 surrounding the jet 16 has an internal surface reflecting the microwaves passing through the jet 16. The microwaves will then again meet the jet 16 uniformly distributed around its periphery, this time from the outside of the jet. Also, the member 6 is reflecting so that the initially emitted microwaves will be reflected between the casing 7 and the member 6 several times, until they are fully absorbed by the jet 16. The frequency at which the microwaves are emitted by the member 6 is so chosen that the emitted waves co-operate with the reflected waves, whereby resonance will be achieved in the space between the member 6 and the casing 7.

When the downwardly flowing liquid has passed the member 6 and has been heated to a desired extent, it will fall into the funnel-shaped flange 12. The inside of the flange 12 is continuously overflowed, from above and downwardly, by cold liquid of the same kind as the liquid of the jet 16. This cold liquid enters chamber 8 from inlet 10 and flows into the interior of the casing 7 over the upper edge of the flange 12 through the annular slot 11 between the flanges 9 and 12. The heated liquid is thus rapidly cooled and then flows out of the casing through the outlet pipe 15 together with the cold liquid coming in through the slot 11. Due to the shape of the heated liquid jet 16, a very rapid cooling is possible. This can be necessary when the liquid is heated to a very high temperature, for instance, in connection with sterilization, and must be rapidly cooled in order not to be spoiled in some respect. The cooling may be made still more effective by providing a further cooling liquid layer in addition to the cooling liquid layer flowing over the flange 12. This further liquid layer can be caused to meet the heated liquid from the inside of the jet 16, as illustrated in the drawing. For this purpose, there is arranged within the funnel-shaped flange 12 a member 18 having a central channel 19 which is supplied from below with cold liquid, preferably from the same source supplying liquid to the inlet 10. The member 18 has at its upper part a slot 20 extending around and being directed toward the inside of the jet 16, which slot receives cold liquid from the central channel 19 and directs it into contact with the jet 16 all around its inner periphery.

As can be seen from the drawing, an interspace 17 is left between the holder 5 of the member 6 and the ring-like member 1, through the center of which the holder 5 extends. This ensures that the spaces formed in the casing 7, within and outside the jet 16, are in communication with each other. Within the casing, a super-atmospheric pressure should prevail; but means for providing this are not shown in the drawing, as such means are well known and are not part of the present invention.

Instead of having an interspace 17 between the holder 5 and the member 1, the two spaces within and outside the jet 16 could be connected to the same pressure source in order to ensure the same pressure in the two spaces. It is also possible, if desired, to arrange for different gas pressures within and outside the jet 16. In this way, possibly in combination with a modification of the annular outlet of the member 1, jets of different shapes (for instance, initially divergent and then convergent) may be obtained in the casing 7. Control of the shape of the jet may be desirable in order that the apparatus shall be usable for the heating of liquids having different viscosity and surface tension. It could also be desirable to control the diameter of the jet, or the angle at which the jet meets the layer or layers of cold liquid flowing in the lower part of the casing 7, so as to achieve the best possible cooling of the heated liquid. The jet in any case should be prevented from coming into contact with the member 6 and the casing 7.

Also important for the shape of the jet 16 is the width of the annular slot forming the outlet 4 of the chamber 2. The width of the slot may be adjustable by means of members movable relative to each other. For instance, the slot may be formed between a central conical part and a ring arranged around and coaxially with said part, the inner edge of the ring being formed to match the conical part. By axial relative motion between these two parts, the width of the slot may be varied.

Only a preferred embodiment of the present invention has been illustrated, but it will be understood that several other embodiments fall within the scope of the subsequent claims.

I claim:

1. In an apparatus for electromagnetic heating of liquids, the combination of means for forming the liquid to be heated into a jet, and means for transferring to said jet electromagnetic energy uniformly distributed around the periphery of the jet as viewed in a cross-section of the jet, the combination being characterized in that said forming means include a body having a liquid receiving portion and a liquid discharging portion extending generally along a closed circuit for forming the liquid into a jet having a generally annular cross-section and which is free from contact with any surface, said discharging portion being dimensioned to provide said annular cross-section with a thin wall, whereby each part of the jet as viewed in said annular cross-section is heated to substantially the same temperature.

2. The combination according to claim 8, in which said energy transferring means comprise two members arranged coaxially relative to the annular jet, at least one of said members being operable to emit electromagnetic energy.

3. The combination according to claim 2, in which said one member is operable to emit microwaves.

4. The combination according to claim 2, in which said one member is located within the annular jet, the other member surrounding the jet.

5. The combination according to claim 8, in which said energy transferring means define a space where the annular jet is to be heated and are operable to emit electromagnetic waves at a frequency for achieving resonance in said space.

6. The combination according to claim 1, in which the apparatus also comprises a generally annular wall positioned to surround said jet in spaced relation thereto.

7. The combination according to claim 6, in which said body of the jet-forming means is a hollow body having an inlet for the liquid and also having a downwardly directed liquid outlet of generally annular shape.

* * * * *

UNITED STATES PATENT OFFICE
CERTIFICATE OF CORRECTION

Patent No. 3,668,358      Dated June 6, 1972

Inventor(s) Lennart Arvid Stenstrom

It is certified that error appears in the above-identified patent and that said Letters Patent are hereby corrected as shown below:

In claim 2, line 1, "claim 8" should be --claim 1--.

In claim 5, line 1, "claim 8" should be --claim 1--.

Signed and sealed this 17th day of October 1972.

(SEAL)
Attest:

EDWARD M. FLETCHER, JR.
Attesting Officer

ROBERT GOTTSCHALK
Commissioner of Patents